United States Patent
Grewal et al.

(10) Patent No.: US 8,122,055 B2
(45) Date of Patent: Feb. 21, 2012

(54) HOSTED MULTI-TENANT APPLICATION WITH PER-TENANT UNSHARED PRIVATE DATABASES

(75) Inventors: Jasjit Singh Grewal, Sammamish, WA (US); David Robert Shutt, Seattle, WA (US); Jeremy Kolpak, Seattle, WA (US); Jagan Peri, Issaquah, WA (US); Elliot Stephenson Lewis, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1011 days.

(21) Appl. No.: 11/789,993

(22) Filed: Apr. 26, 2007

(65) Prior Publication Data

US 2008/0270459 A1    Oct. 30, 2008

(51) Int. Cl.
*G06F 17/30* (2006.01)

(52) U.S. Cl. ........ 707/784; 707/610; 707/640; 707/661; 707/758; 707/782; 707/783; 707/791; 707/802; 709/226; 709/791; 709/802; 718/100

(58) Field of Classification Search .................. 707/610, 707/640, 661, 758, 782, 783, 784, 791, 802, 707/999.201, 999.202, 999.203, 999.204; 709/218, 225, 226; 718/100
See application file for complete search history.

(56) References Cited

U.S. PATENT DOCUMENTS

| | | | |
|---|---|---|---|
| 6,606,627 B1* | 8/2003 | Guthrie et al. | 1/1 |
| 6,993,657 B1 | 1/2006 | Renner et al. | |
| 7,100,195 B1 | 8/2006 | Underwood | |
| 7,987,167 B1 | 7/2011 | Kazar et al. | |
| 2002/0049608 A1 | 4/2002 | Hartsell et al. | |
| 2002/0049841 A1* | 4/2002 | Johnson et al. | 709/225 |
| 2003/0051195 A1 | 3/2003 | Bosa et al. | |
| 2003/0088616 A1 | 5/2003 | Etessami et al. | |
| 2003/0212654 A1 | 11/2003 | Harper et al. | |
| 2004/0073786 A1 | 4/2004 | O'Neill et al. | |
| 2004/0117220 A1 | 6/2004 | Chess et al. | |
| 2005/0049937 A1 | 3/2005 | Sanders | |
| 2005/0182745 A1* | 8/2005 | Dhillon et al. | 707/1 |
| 2005/0188345 A1 | 8/2005 | Chang et al. | |
| 2005/0283478 A1 | 12/2005 | Choi et al. | |
| 2006/0059035 A1 | 3/2006 | Kraft et al. | |
| 2006/0069717 A1 | 3/2006 | Mamou et al. | |

(Continued)

OTHER PUBLICATIONS

Clifton, et al., "Privacy Preserving Data Integration and Sharing", Date: 2004, pp. 19-26, http://delivery.acm.org/10.1145/1010000/1008698/p19-clifton.pdf? key1=1008698&key2=9879328611&coll=ACM&dl=ACM&CFID=75919783&CFTOKEN=92791909.

(Continued)

*Primary Examiner* — Syling Yen
(74) *Attorney, Agent, or Firm* — Hope Baldauff Hartman, LLC

(57) ABSTRACT

Technologies are described herein for providing a hosted multi-tenant application that utilizes per-tenant unshared private databases. A shared middle-tier is utilized in conjunction with private, unshared databases for each of the tenants. The private, unshared databases are utilized to store application data for an associated tenant, along with any customizations to the application implemented by the tenant. A shared configuration database is also utilized that stores application data that is shared among the tenants. When a request is received from a tenant to access the hosted application, the shared configuration database is utilized to locate the private, unshared database associated with the tenant making the request. The contents of the private, unshared database associated with the tenant making the request are then utilized to response to the request.

11 Claims, 6 Drawing Sheets

U.S. PATENT DOCUMENTS

| | | | |
|---|---|---|---|
| 2006/0178918 | A1 | 8/2006 | Mikurak |
| 2006/0195476 | A1* | 8/2006 | Nori et al. ................. 707/104.1 |
| 2006/0247944 | A1 | 11/2006 | Calusinski et al. |
| 2007/0067354 | A1* | 3/2007 | Mullender et al. ............ 707/201 |
| 2007/0130137 | A1 | 6/2007 | Oliver et al. |
| 2007/0156902 | A1* | 7/2007 | Becker .......................... 709/226 |
| 2007/0162537 | A1 | 7/2007 | Juncker |
| 2008/0040335 | A1 | 2/2008 | Gatti et al. |
| 2008/0086479 | A1 | 4/2008 | Fry et al. |
| 2009/0049056 | A1 | 2/2009 | Shutt et al. |

OTHER PUBLICATIONS

Kim, et al., "A Distributed Object-Oriented Database System Supporting Shared and Private Databases", Date: 1991, vol. 9, Issue 1, pp. 31-51, http://delivery.acm.org/10.1145/110000/103733/p31-kim.pdf?key1=103733&key2=5468328611&coll=ACM&dl=ACM&CFID=75919783&CFTOKEN=92791909.

Chong et al., "Building Distributed Applications: Architecture Strategies for Catching the Long Tail," Apr. 2006, Microsoft Corporation, 20 pages.

Multitenant Platforms, salesforce.com, downloaded Apr. 28, 2008, 2 pages.

A2ZApplications.Com Indi's First Multi-Tenant, Multi-Utility Software-as-a-Service Platform, A2ZApplications.com, downloaded Apr. 28, 2008, 2 pages.

U.S. Official Action dated Oct. 21, 2010 in U.S. Appl. No. 12/147,588.

U.S. Official Action dated Feb. 28, 2011 in U.S. Appl. No. 12/147,588.

U.S. Official Action dated Sep. 12, 2011 in U.S. Appl. No. 12/147,588.

* cited by examiner

HOSTED MULTI-TENANT APPLICATION WITH PER-TENANT UNSHARED PRIVATE DATABASES

BACKGROUND

A hosted application is a software application where the software resides on servers that are accessed through a wide-area network, such as the Internet, rather than more traditional software that is installed on a local server or on individual client computers. Hosted applications may also be known as Internet-applications, application service providers ("ASPs"), web-based applications, or on-line applications. Hosted applications are commonly utilized concurrently by multiple organizations, called "tenants."

One type of hosted application is a customer relationship management ("CRM") application. CRM applications allow businesses to manage the relationships with their customers, including the capture, storage, and analysis of customer information. Some hosted CRM applications utilize a multi-tier architecture wherein the middle-tier that performs the business logic is separated from the database-tier where application and tenant data is stored. In many cases, the database-tier is shared among all of the tenants. Use of a shared database-tier in this manner is problematic, however, because a scheduled or unscheduled database outage in such a system will affect all of the tenants simultaneously. Moreover, because all tenants share the same database-tier, application performance for all of the tenants may be significantly reduced if just one tenant places an excessive load on the database. Reduced performance may be unacceptable to the tenants of such a system. Additionally, when a single database is utilized for all of the tenants of a hosted application, it may be difficult for a tenant to customize the schema that is utilized to store the database.

Other hosted CRM applications utilize a multi-tier architecture wherein each tenant utilizes a middle-tier and a database-tier that are maintained separately from all other tenants. This type of architecture may be implemented, for instance, by providing each tenant with a virtual server computer for hosting the middle-tier and the database-tier. This type of architecture allows outages to be confined to a single tenant or a small group of tenants, and reduces the possibility that an excessive load by one tenant will impact application performance for other tenants. This type of architecture, however, suffers from several other significant drawbacks. In particular, it can be complex and expensive to operationally maintain the separate operating system and application installation on the virtual server computer provided for each hosted tenant. Moreover, allocated hardware resources may remain unused by tenants that cannot utilize all of the processing and storage capabilities of a dedicated virtual server computer.

It is with respect to these considerations and others that the disclosure made herein is provided.

SUMMARY

Technologies are described herein for providing a hosted multi-tenant application that utilizes per-tenant unshared private databases. Through the utilization of aspects presented herein, a hosted application can be provided in a manner that keeps individual tenant data private from other tenants, reduces the possibility that a service outage will affect large numbers of tenants, and reduces the impact of excessive load by one tenant on the other tenants. Moreover, through the use of aspects described herein, a hosted application can be provided in a manner that does not require the provision and maintenance of a virtual server computer for each tenant and that efficiently utilizes available hardware resources.

According to one aspect presented herein, a hosted application is provided that supports concurrent use by multiple tenants. The hosted application may be a hosted business application, such as a CRM application, or another type of application. The hosted application is provided through the use of a middle-tier that is shared by the tenants of the hosted application. As described briefly above, the middle-tier represents the software and hardware components that provide the hosted application to the tenants, including the performance of any business logic implemented by the application. A database-tier operates in conjunction with the middle-tier.

Through other aspects presented herein, a private, unshared database is created for each of the tenants. Each private, unshared database is associated with a particular tenant and is inaccessible to the other tenants. The private, unshared databases are utilized to store application data for an associated tenant, along with any customizations to the application implemented by the tenant. The private, unshared databases may be implemented as structured query language ("SQL") databases maintained by a SQL server database application program in the database-tier.

According to other aspects, a shared configuration database is also utilized. The shared configuration database stores application data that is shared among the tenants. The shared configuration database also stores data identifying the location of each private, unshared database for each tenant. When a request is received from a tenant to access the hosted application, the shared configuration database is utilized to locate the private, unshared database associated with the tenant making the request. The contents of the private, unshared database associated with the tenant making the request are then utilized to response to the request.

According to other aspects presented herein, the server computers utilized to provide the hosted application may be organized into scale groups. A scale group is a logical grouping of servers. Each scale group includes a shared middle-tier and a database-tier for supporting the tenants assigned to the scale group. When a new tenant is provisioned, the tenant is assigned to a scale group and a database server in the assigned scale group creates the private, unshared database for the tenant. An association between the tenant and the scale group is also created in the shared configuration database. When a request is received from a tenant to access the hosted application, the shared configuration database is consulted to locate the scale group hosting the private, unshared database for the tenant. Once the appropriate scale group has been located, the request is redirected to the middle-tier in the appropriate scale group for processing.

According to additional aspects, the average workload of scale groups and individual server computers within scale groups is monitored. If a particular server within a scale group is experiencing an excessive average workload, one or more of the private, unshared databases maintained by the server may be moved to another server computer within the scale group. If a particular scale group is experiencing an excessive average workload, one or more of the private, unshared databases maintained by servers within the scale group may be moved to another scale group. When a private, unshared database is moved, the mapping stored in the shared configuration database is updated to reflect the new location of the private, unshared database.

The above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for providing a hosted multi-tenant application that utilizes per-tenant unshared private databases. Through the use of the embodiments presented herein, each tenant of a hosted application is assigned a private unshared database that is utilized to store all of the data and application customizations that are unique to the tenant. Shared, non-private information is kept in a configuration database that is shared between all of the tenants. In this way, individual tenant data is kept private from other tenants, the possibility that a database outage will affect large numbers of tenants is reduced, and the impact of excessive load by one tenant on the other tenants can be minimized.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
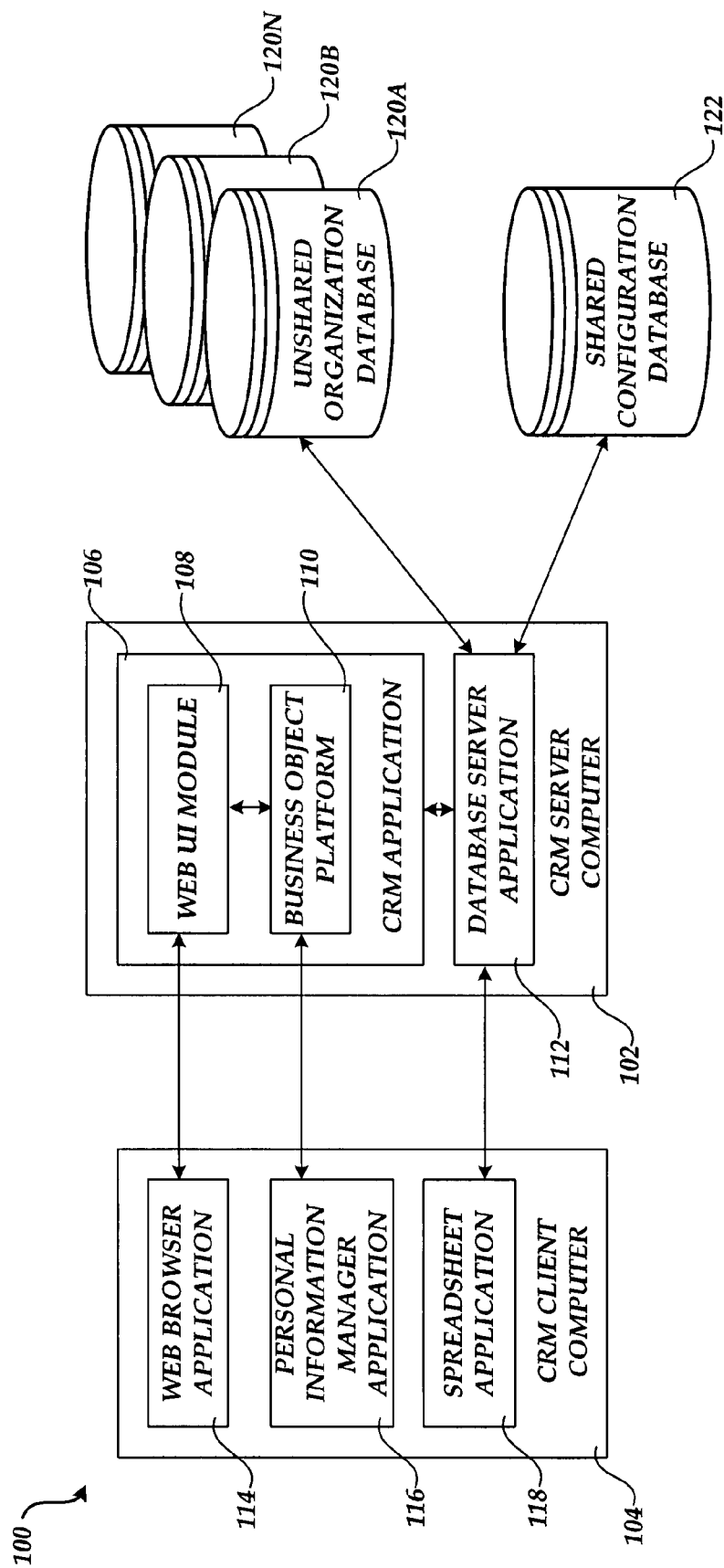
FIGS. 1-2 are software architecture diagrams illustrating aspects of a software architecture utilized in several of the embodiments presented herein.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for providing a hosted, multi-tenant application program will be described. In particular, FIG. 1 is a network and software architecture diagram that provides details regarding an illustrative operating environment for the embodiments presented herein along with aspects of several software components presented herein. As discussed briefly above, the illustrative computing system 100 shown in FIG. 1 provides a hosted, multi-tenant application program. In the embodiments presented herein, the application program is a program for providing CRM functionality. It should be appreciated, however, that any type of hosted application may be implemented utilizing the technologies presented herein, including other types of hosted business applications.

Through the use of the system 100 shown in FIG. 1, multiple organizations, referred to herein as "tenants," may concurrently utilize the computing resources provided by the system 100. The illustrative computing system 100 shown in FIG. 1 includes a CRM server computer 102. The CRM server computer 102 executes a CRM application 106 and maintains one or more associated databases, described more fully herein. The CRM application 106 provides functionality for managing relationships with business customers, including the capture, storage, and analysis of customer information.

The CRM functionality provided by the CRM application 106 may be accessed through the use of a web browser application 114 executing on a client computer, such as the CRM client computer 104. In this regard, the CRM application 106 includes a web user interface ("UI") module 108 for exposing a web-compatible network interface. In this manner, the CRM client computer 104 can be utilized to access functionality provided by the CRM application 106 for creating and viewing customer information, for communicating with customers via the CRM application 106, and for performing other CRM-related functions.

According to embodiments presented herein, the CRM application 106 also includes a business object platform 110. The business object platform 110 is a software platform for executing software components that perform the actual business processing for the CRM application 106. The business object platform 110 operates in conjunction with the web UI module 108 to make this functionality accessible through a web interface. Aspects of the functionality provided by the CRM application 106 may also be accessed through a plug-in to a personal information manager ("PIM") application 116. In one embodiment, a plug-in executing within the PIM application 116 communicates directly with the business object platform 110 to enable this functionality.

As shown in FIG. 1, the CRM application 106 operates in conjunction with a database server application 112, which also executes on the CRM server computer 102. The database server application 112 provides functionality for creating, maintaining, accessing, and updating one or more databases. According to embodiments, the database server application 112 comprises the SQL SERVER database server application from MICROSOFT CORPORATION of Redmond, Wash. It should be appreciated that any suitable database server application may be utilized in the manner described herein.

Through the use of the database server application 112, the CRM application 106 is operative to maintain several databases. In particular, the CRM application 106 maintains a shared configuration database 122. As will be described in greater detail herein, the CRM application 106 utilizes the shared configuration database 122 to store global system-level information and data that is shared by the tenants. For instance, according to embodiments, the shared configuration database 122 may be utilized to store information about tenants, such as their name and contact information, information about which tenant particular users are members of, and information mapping authentication data to a specific user. In one implementation presented herein, the shared configuration database 122 is also utilized to store data defining the location of an unshared organization database 120 for each tenant hosted by the CRM application 106. Additional details regarding the use of this data will be provided below.

The CRM application 106 also maintains the unshared organization databases 120A-120N. The unshared organization databases 120A-120N are utilized by the CRM application 106 to store private, unshared data for the tenants. Each unshared organization database 120A-120N is associated with a particular tenant and its contents are inaccessible to the other tenants. According to aspects, each unshared organization database 120A-120N is utilized to store private tenant data for the associated tenant. Each unshared organization database 120A-120N may also be utilized to store customizations to the CRM application 106 made by the associated tenant including, but not limited to, customized entities, attributes, relationships, forms, views, code-level extensibility plug-ins, and any other type of customization to the CRM application 106. Additional details regarding the creation and use of the shared configuration database 122 and the unshared organization databases 120A-120N will be provided below.

Figure 2:
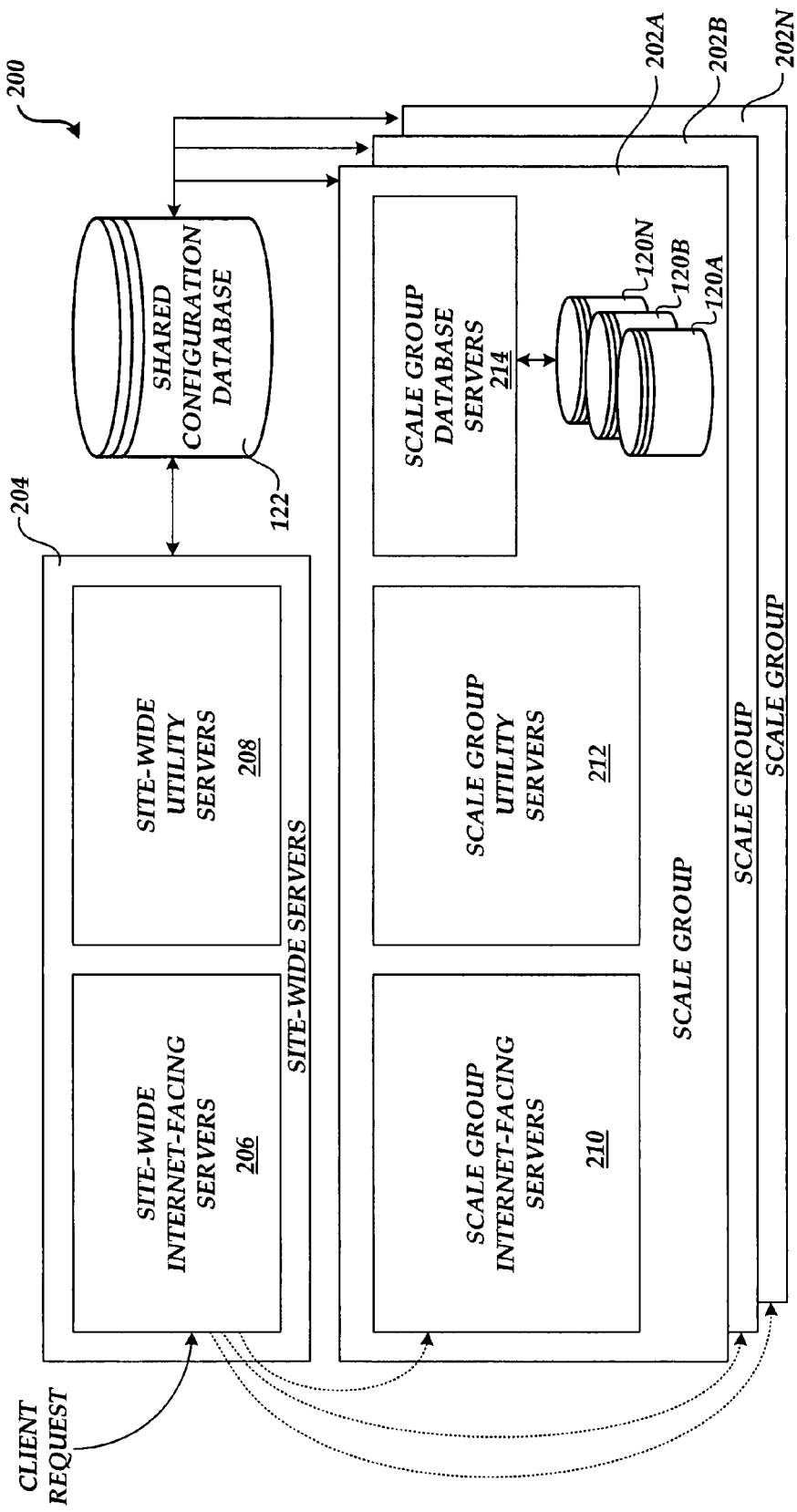

Referring now to FIG. 2, another embodiment of the invention for providing a hosted, multi-tenant application that utilizes per-tenant unshared private databases will be described. In this embodiment, a system 200 is provided wherein the servers that provide the CRM functionality described herein are organized into the scale groups 202A-202N. The scale groups 202A-202N are logical groupings of servers. For instance, according to one implementation, each scale group 202A-202N includes a shared middle-tier and a database-tier for supporting the tenants assigned to the scale group. The scale group Internet-facing servers 210 implement the middle-tier by executing the CRM application 106, while the scale group database servers 214 implement the database-tier by executing the database server application 112. One or more scale group utility servers 212 are also provided within each scale group 202A-202N for performing utility functions, such as reporting services, load balancing, provisioning, configuration, statistics, and others. Each scale group may also include its own configuration database that is private to the scale group but shared amongst all of the tenants of the scale group.

When a new tenant is provisioned within the system 200, the tenant is assigned to one of the scale groups 202A-202N. At this time, one of the scale group database servers 214 in the assigned scale group creates a private, unshared database 120 for the tenant. In this manner, the private, unshared database 120 for the new tenant is created and stored in the assigned scale group 202. An association, or mapping, between the tenant and the assigned scale group 202 is also created in the shared configuration database 122.

As shown in FIG. 2, the system 200 also includes one or more site-wide servers 204. In particular, one or more site-wide Internet-facing servers 206 are provided along with one or more site-wide utility servers 208. The site-wide Internet-facing servers 206 perform site-wide functions for the system 200, including processing sign-in and sign-up requests, site-wide messaging, help functions, and domain name services ("DNS") for mapping each tenant to the appropriate scale group 202A-202N. The site-wide utility servers 208 provide facilities for site configuration, billing, customer support, and others.

As will be described in greater detail below, network client requests to access the hosted application are received at the site-wide Internet-facing servers 206. In response to receiving such requests, the shared configuration database 122 is consulted to locate the scale group 202A-202N hosting the private, unshared database 120 for the tenant making the request. Once the appropriate scale group 202A-202N has been located, the incoming request is redirected to the scale group Internet-facing servers 210 in the identified scale group 202A-202N for processing.

Figure 3:
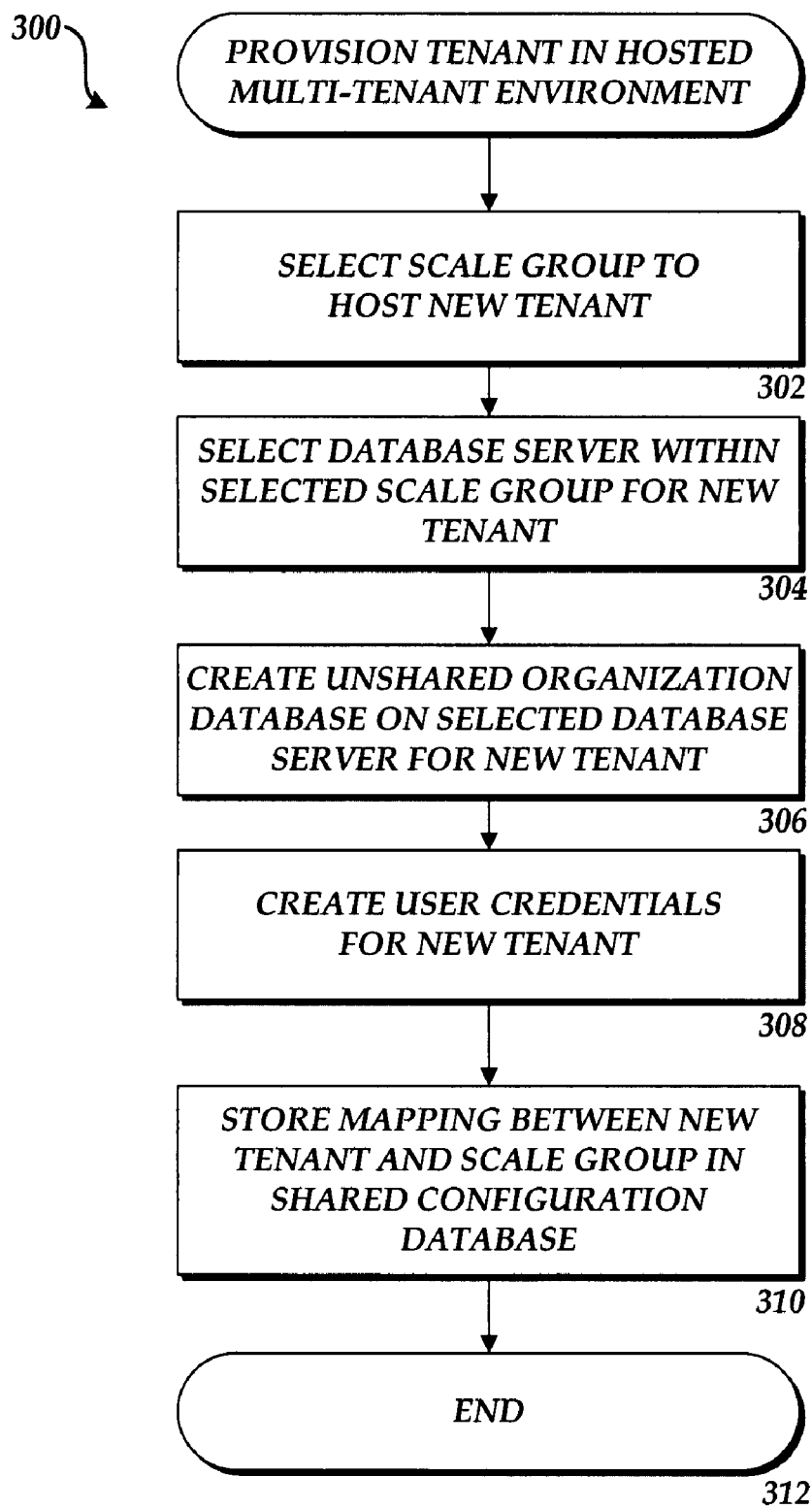
FIGS. 3-5 are flow diagrams showing illustrative processes for providing and utilizing a hosted multi-tenant application that incorporates unshared private per-tenant databases according to one implementation described herein.

Turning now to FIG. 3, additional details will be provided regarding the embodiments presented herein for providing a hosted, multi-tenant application that utilizes private unshared per-tenant databases. In particular, FIG. 3 is a flow diagram showing a routine 300 that shows aspects of an illustrative process for provisioning a new tenant of the hosted multi-tenant system 200 in one implementation described herein.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in FIG. 3 and described herein. These operations may also be performed in a different order than those described herein with respect to FIG. 3.

The routine 300 begins at operation 302, where one of the scale groups 202A-202N is selected for the new tenant. According to embodiments, the scale group to which the new tenant is assigned may be selected based upon the average workload of the servers within each of the scale groups 202A-202N. In this manner, a new tenant may be assigned to a scale group 202A-202N that has available computing and storage capacity. It should be appreciated that other factors may also be utilized in determining the appropriate scale group 202A-202N to which a new tenant should be assigned.

From operation 302, the routine 300 continues to operation 304. At operation 304, a scale group database server 214 is selected within the assigned scale group to service the unshared organization database 120 for the new tenant. As with the scale groups 202A-202N, the particular scale group database server 214 may be selected based upon the average workload of the scale group database servers 214 within the assigned scale group 202. Other factors may also be utilized in identifying a scale group database server 214 for the new tenant.

Once the scale group 202 and the scale group database server 214 have been selected, the routine 300 proceeds to operation 306, where the selected scale group database server 214 creates the unshared organization database 120 for the new tenant. As discussed above, the unshared organization database 120 is utilized to store data and application customizations for the new tenant and is inaccessible by other tenants.

From operation 306, the routine 300 continues to operation 308, where user credentials are created for the new tenant and stored in the shared configuration database 122. The routine 300 then continues to operation 310, where data is stored in the shared configuration database 122 that associates the new tenant and its users with the assigned scale group 202 and scale group database server 214. Once this data has been stored in the shared configuration database 122, the new tenant has been provisioned and can begin using the hosted application. Accordingly, the routine 300 continues from operation 310 to operation 312, where it ends.

Figure 4:
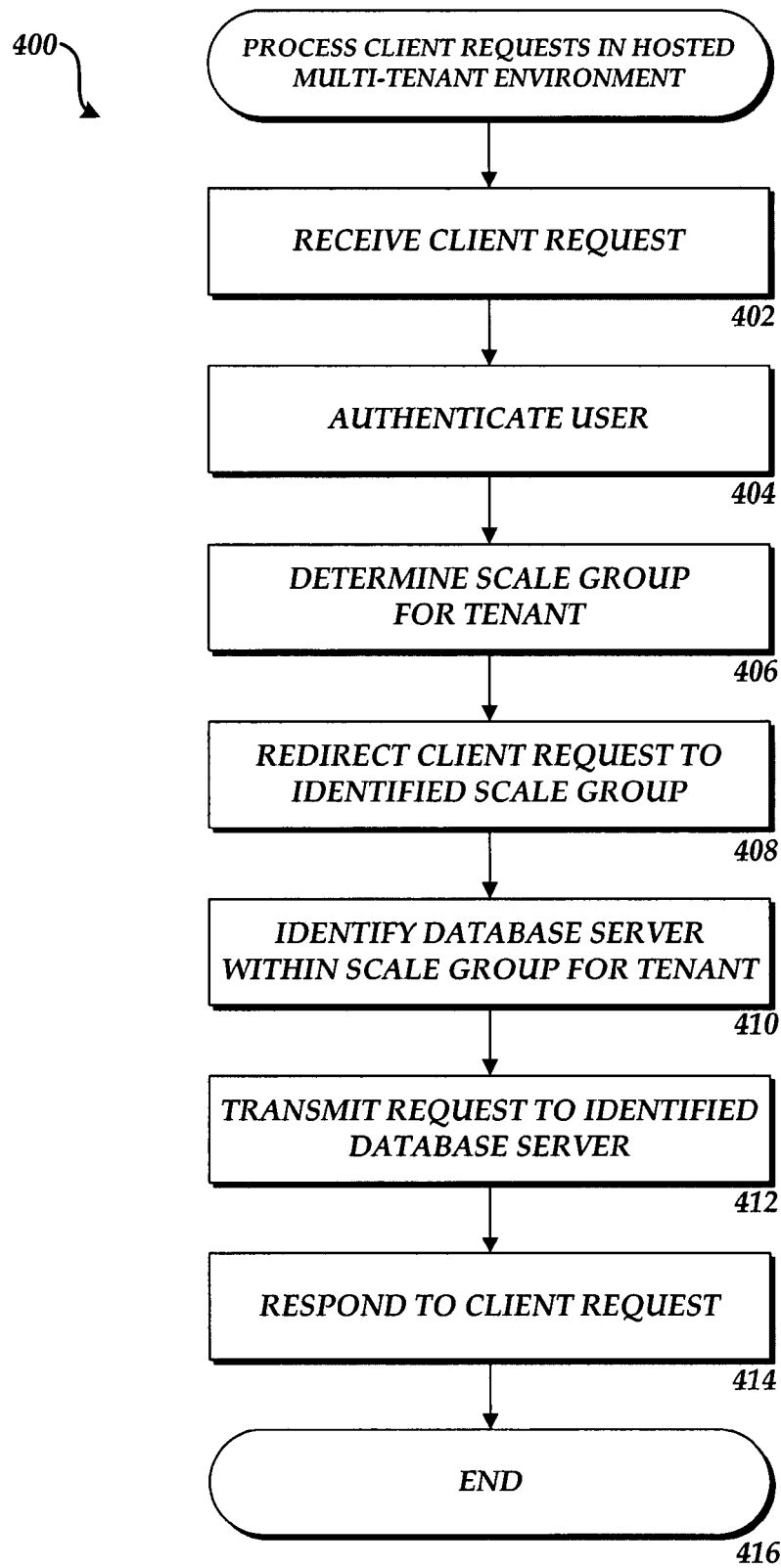

Referring now to FIG. 4, an illustrative routine 400 will be described for processing client requests in the hosted multi-tenant system 200 described above. The routine 400 begins at operation 402, where the site-wide Internet-facing servers 206 receive a request to access the hosted application. In response to receiving such a request, the routine 400 continues to operation 404, where the site-wide utility servers 208 authenticate the user on behalf of whom the request was made and determine the tenant that the user is associated with. These processes are performed utilizing data stored in the shared configuration database 122.

Once the user making the request has been authenticated and the tenant with which the user is associated has been identified, the routine 400 continues to operation 406, where the data stored in the shared configuration database 122 is utilized to identify the scale group 202A-202N associated with the tenant making the incoming request. As discussed above, this data is stored in the shared configuration database 122 at the time the tenant is provisioned. Once the scale group 202 hosting the tenant has been identified, the routine 400 continues to operation 408, where the incoming request is redirected by the site-wide Internet-facing servers 206 to the identified scale group 202.

From operation 408, the routine 400 continues to operation 410, where data stored in the shared configuration database 122 is utilized to identify the scale group database server 214 that maintains the unshared organization database 120 for the tenant making the incoming request. Once the appropriate scale group database server 214 has been identified, a connection is made to the identified database server 214 to obtain any private tenant data necessary to respond to the incoming request. This occurs at operation 412. Once the data has been obtained, the data is utilized to respond to the incoming tenant request at operation 414. From operation 414, the routine 400 continues to operation 416, where it ends.

Figure 5:
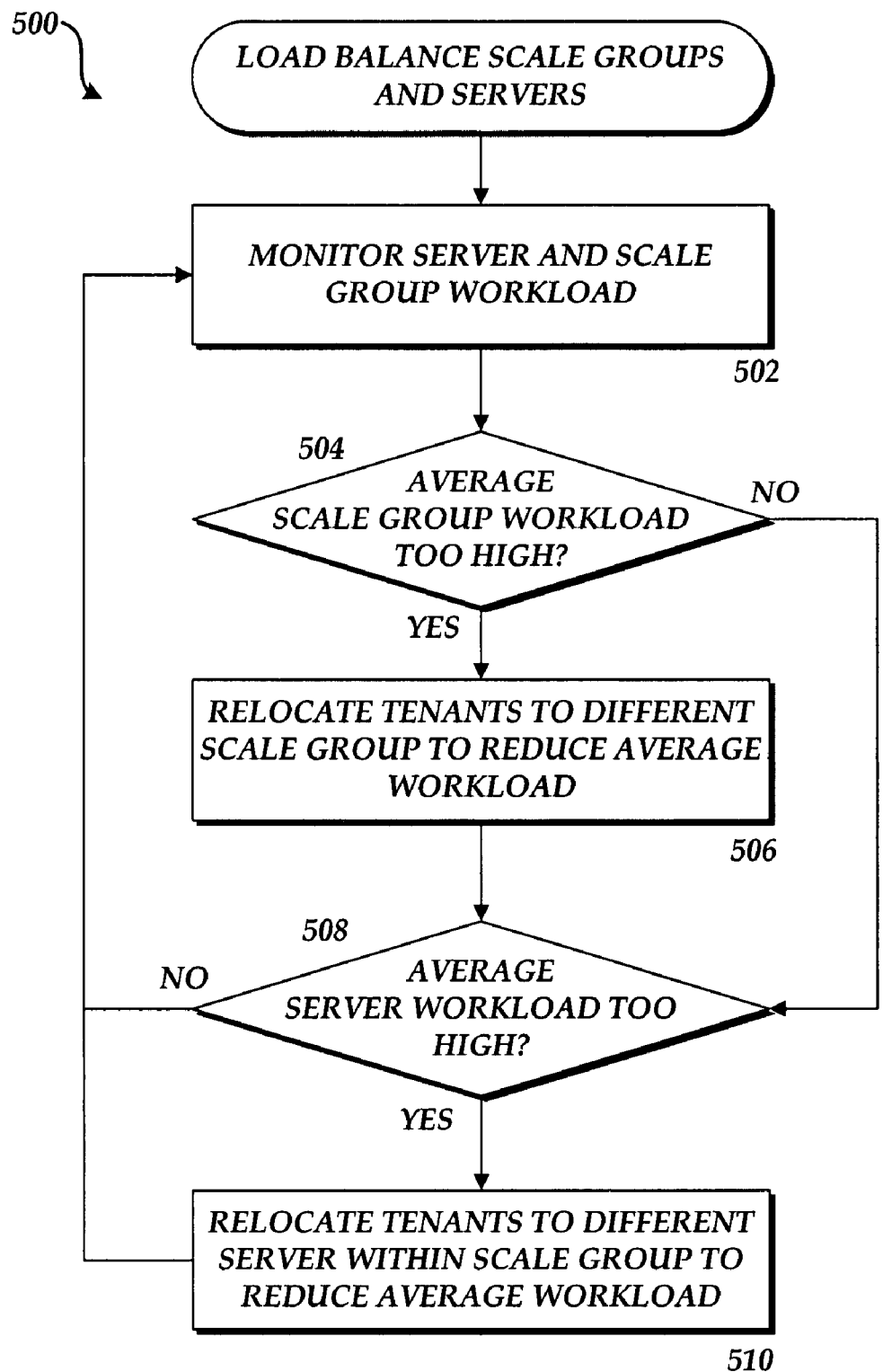

Turning now to FIG. 5, an illustrative routine 500 will be described for load balancing the scale groups 202A-202N and the servers within each of the scale groups 202A-202N. Because each tenant in the systems described herein is assigned a private unshared database, the location of these databases can be easily changed depending upon the load that an individual tenant is placing on the middle-tier and database-tier computing systems. In this manner, the computing resources described above with respect to FIGS. 1-2 can be allocated to the various tenants in an efficient manner that is likely to reduce the possibility that activities by one tenant will adversely impact the performance experienced by other tenants. FIG. 5 illustrates one such process for load balancing the scale groups 202A-202N and the servers within each of the scale groups 202A-202N.

The routine 500 begins at operation 502, where the average workload of the scale groups 202A-202N and the individual server computers within each of the scale groups 202A-202N is monitored. The routine 500 then continues to operation 504, where a determination is made as to whether the average workload for each scale group 202 is too high. If a particular scale group 202 is experiencing an excessive average workload, the routine 500 proceeds to operation 506, where one or more of the private, unshared databases 120A-120N maintained by servers within the identified scale group 202 are moved to another one of the scale groups 202A-202N, preferably with a lower average workload. If none of the scale groups 202A-202N are experiencing an undesirably high workload, the routine 500 proceeds from operation 504 to operation 508.

At operation 508, a determination is made as to whether any server computer within each of the scale groups 202A-202N is experiencing an undesirably high average workload. If so, the routine 500 proceeds from operation 508 to operation 510, where one or more of the private, unshared databases 120A-120N maintained by the identified server are moved to another server computer within the scale group 202 or to another scale group 202. It should be appreciated that when a private, unshared database 120 is moved, the mapping stored in the shared configuration database 122 is updated to reflect the new location of the private, unshared database. From operation 510, the routine 500 returns to operation 502, where the above-described process is periodically repeated to maintain an appropriate workload balance across the scale groups 202A-202N and the server computers located within each of the scale groups 202A-202N.

Figure 6:
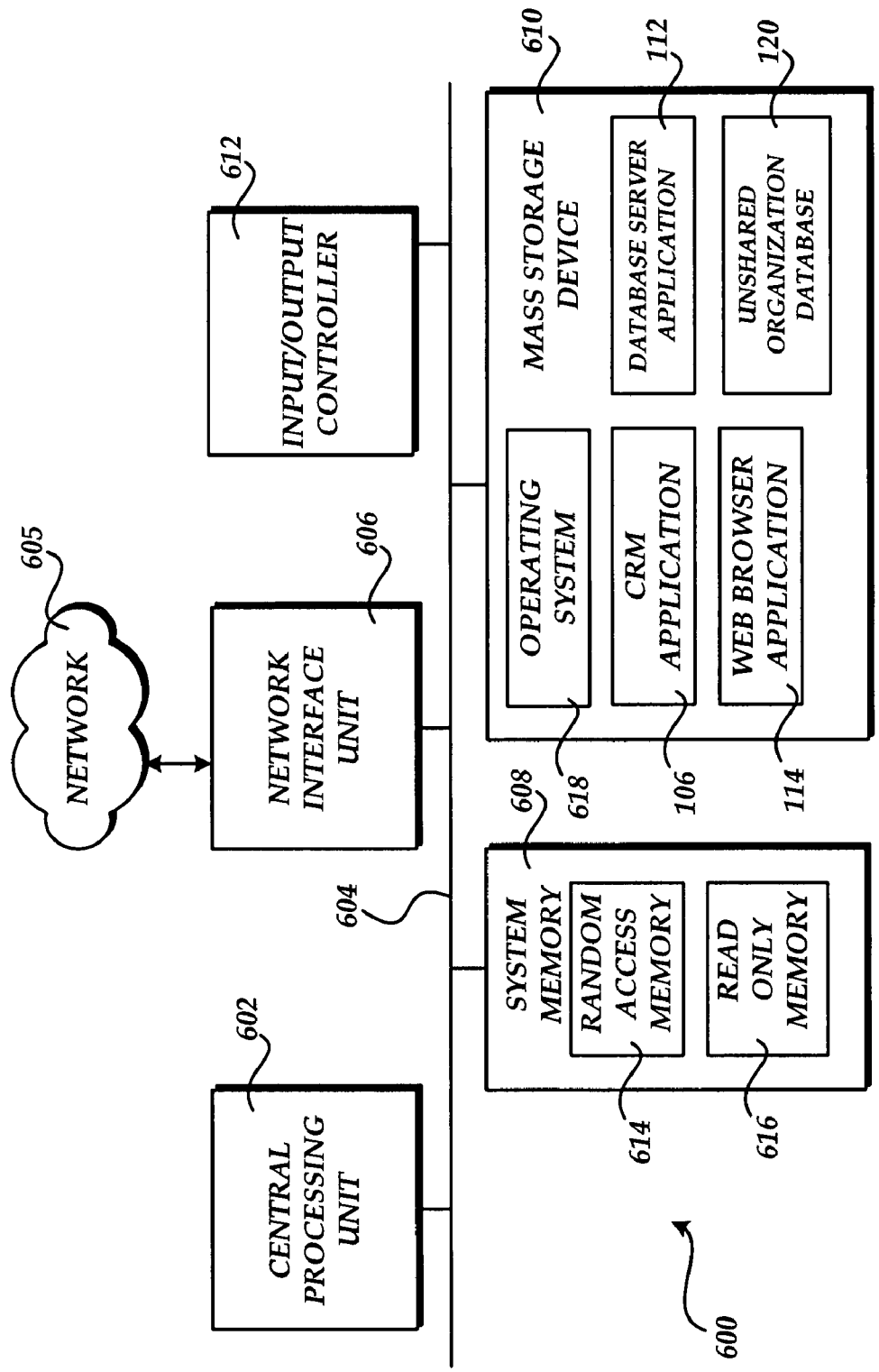
FIG. 6 is a computer architecture diagram showing an illustrative hardware architecture suitable for implementing the computing systems described with reference to FIGS. 1-5.

Referring now to FIG. 6, an illustrative computer architecture for a computer 600 capable of executing the software components described above with respect to FIGS. 1-5 will be discussed. The computer architecture shown in FIG. 6 illustrates a conventional desktop, laptop computer, or server computer and may be utilized to embody any of the computer systems described herein.

The computer architecture shown in FIG. 6 includes a central processing unit 602 ("CPU"), a system memory 608, including a random access memory 614 ("RAM") and a read-only memory ("ROM") 616, and a system bus 604 that couples the memory to the CPU 602. A basic input/output system containing the basic routines that help to transfer information between elements within the computer 600, such as during startup, is stored in the ROM 616. The computer 600 further includes a mass storage device 610 for storing an operating system 618, application programs, and other program modules, which will be described in greater detail below.

The mass storage device 610 is connected to the CPU 602 through a mass storage controller (not shown) connected to the bus 604. The mass storage device 610 and its associated computer-readable media provide non-volatile storage for the computer 600. Although the description of computer-readable media contained herein refers to a mass storage device, such as a hard disk or CD-ROM drive, it should be appreciated by those skilled in the art that computer-readable media can be any available computer storage media that can be accessed by the computer 600.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 600.

According to various embodiments, the computer 600 may operate in a networked environment using logical connections to remote computers through a network such as the network 605. The computer 600 may connect to the network 605 through a network interface unit 606 connected to the bus 604. It should be appreciated that the network interface unit 606 may also be utilized to connect to other types of networks and remote computer systems. The computer 600 may also include an input/output controller 612 for receiving and processing input from a number of other devices, including a keyboard, mouse, or electronic stylus (not shown in FIG. 6). Similarly, an input/output controller may provide output to a display screen, a printer, or other type of output device (also not shown in FIG. 6).

As mentioned briefly above, a number of program modules and data files may be stored in the mass storage device 610 and RAM 614 of the computer 600, including an operating system suitable for controlling the operation of a networked desktop, laptop, or server computer. The mass storage device 610 and RAM 614 may also store one or more program modules. In particular, the mass storage device 610 and the RAM 614 may store the CRM application 106, the web browser application 114, the database server application 112, and the unshared organization database 120, each of which has been described above with reference to FIGS. 1-5. Other program modules described herein may also be stored in the mass storage device 610 and utilized by the computer 600.

Based on the foregoing, it should be appreciated that technologies for providing a hosted multi-tenant application that utilizes per-tenant unshared private databases are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A system for providing a hosted application to a plurality of tenants, the system comprising:
    a private unshared database stored at a database server within a scale group;
    a configuration database storing mapping data that is shared among the plurality of tenants, the configuration database being configured to store mapping data for mapping each of the plurality of tenants to a scale group storing the private unshared database associated with the tenant; and
    a computer executing an application configured to
        receive a request for the hosted application from one of the plurality of tenants,
        in response to the request, locate a private unshared database associated with the one of the plurality of tenants by searching the configuration database shared among the plurality of tenants to retrieve the mapping data indicating the database server and the scale group where the private unshared database associated with the one of the plurality of tenants is stored, and
        respond to the request for the hosted application utilizing data stored in the located private unshared database, wherein the hosted application comprises a customer relationship management application accessed through a plug-in executing within a personal information manager application.

2. The system of claim 1, further comprising a structured query language (SQL) server application configured to create and maintain the configuration database and the private unshared databases.

3. The system of claim 1, wherein the computer is further configured to:
    monitor an average workload of the scale group;
    move the private unshared database to a new scale group based, at least partially, upon the average workload of the scale group; and
    update the mapping data stored at the configuration database to indicate movement of the private unshared database to the new scale group.

4. A method for providing a hosted application to a plurality of tenants, the method comprising:
    storing a private unshared database at a database server within a scale group;
    storing mapping data at a configuration database shared among the plurality of tenants, the configuration database being configured to store mapping data for mapping each of the plurality of tenants to a scale group storing the private unshared database associated with the tenant;
    receiving a request for the hosted application from one of the plurality of tenants;
    in response to the request, locating a private unshared database associated with the one of the plurality of tenants by searching the configuration database shared among the plurality of tenants to retrieve the mapping data indicating the database server and the scale group where the private unshared database associated with the one of the plurality of tenants is stored; and
    responding to the request for the hosted application utilizing data stored in the located private unshared database, wherein the hosted application comprises a customer relationship management application accessed through a plug-in executing within a personal information manager application.

5. The method of claim 4, wherein the private unshared database is maintained by a structured query language (SQL) application.

6. The method of claim 4, further comprising:
    monitoring an average workload of the scale group;
    moving the private unshared database to a new scale group based, at least partially, upon the average workload of the scale group; and
    updating the mapping data stored at the configuration database to indicate movement of the private unshared database to the new scale group.

7. The method of claim 4, wherein the configuration database and the private unshared databases are created and maintained by a structured query language (SQL) server application.

8. A computer-readable medium having computer-executable instructions stored thereupon which, when executed by a computer, cause the computer to:
    provide a shared middle-tier operative to provide a hosted business application to a plurality of tenants;
    store a private unshared database for each of the plurality of tenants in one or more scale groups, the scale groups accessible to the shared middle-tier;
    store mapping data at a configuration database shared among the plurality of tenants, the configuration database being configured to store mapping data for mapping each of the plurality of tenants to a scale group storing the private unshared database associated with the tenant;
    receive at the shared middle-tier a request to access the hosted business application from one of the tenants;
    in response to receiving the request, locate the private unshared database associated with the one of the plurality of tenants and inaccessible to the other tenants by searching the configuration database to retrieve the mapping data indicating for the database server and the scale group where the private unshared database associated with the one of the plurality of tenants is stored; and to respond to the request to access the hosted business application utilizing data stored in the located private unshared database associated with the one of the tenants, wherein the hosted business application comprises a customer relationship management application accessed through a plug-in executing within a personal information manager application.

9. The computer-readable medium of claim 8, wherein the private unshared databases are maintained by a structured query language (SQL) application.

10. The computer-readable medium of claim 8, having further computer-executable instructions stored thereupon which, when executed by the computer, cause the computer to:

monitor an average workload of the scale groups;

move one or more private unshared databases to new scale groups based, at least partially, upon the average workload of the scale groups; and update the mapping data stored at the configuration database to indicate movement of the private unshared database to the new scale group.

11. The computer-readable medium of claim 9, wherein the SQL application is further configured to create and maintain the configuration database and to create the private unshared databases.

* * * * *